United States Patent [19]

Compton et al.

[11] Patent Number: 4,974,274
[45] Date of Patent: Dec. 4, 1990

[54] METHOD OF MAKING AN ENGINE CLIP BOLT

[75] Inventors: Clair E. Compton, Simi Valley; Jean-Paul A. Nicolle, Canoga Park, both of Calif.

[73] Assignee: VSI Corporation, Culver City, Calif.

[21] Appl. No.: 511,999

[22] Filed: Apr. 12, 1990

Related U.S. Application Data

[63] Continuation of Ser. No. 374,479, Jun. 30, 1989, abandoned, which is a continuation of Ser. No. 253,706, Oct. 5, 1988, abandoned.

[51] Int. Cl.⁵ .................................................. B21K 1/48
[52] U.S. Cl. ..................................... 10/27 R; 10/27 H; 29/505; 29/521
[58] Field of Search ................. 10/11 R, 27 R, 27 H; 29/505, 521, 522 R; 72/67, 406; 411/166, 169, 396, 400, 965, 999

[56] References Cited

U.S. PATENT DOCUMENTS

| | | | |
|---|---|---|---|
| 469,261 | 2/1892 | Moran | 10/27 R |
| 1,688,423 | 10/1928 | Jardine | 10/27 R |
| 3,451,456 | 6/1969 | Dey | 411/166 |
| 3,828,382 | 8/1974 | Nakamura | 10/27 R |
| 4,391,121 | 7/1983 | Taruntaev | 72/67 X |

FOREIGN PATENT DOCUMENTS 1278102 12/1986 U.S.S.R. ................................. 72/67

Primary Examiner—E. Michael Combs
Attorney, Agent, or Firm—Christie, Parker & Hale

[57] ABSTRACT

Bolt material is orbitally swaged into recesses in the clip while simultaneously swaging bolt material over the clip to develop a torsional interference lock and an axial interference lock, respectively between the clip and the bolt. The recesses are arc shaped, have a center of curvature on a circle having a smaller diameter than a circle that defines lands between the recessses, and number between six and eight.

16 Claims, 3 Drawing Sheets

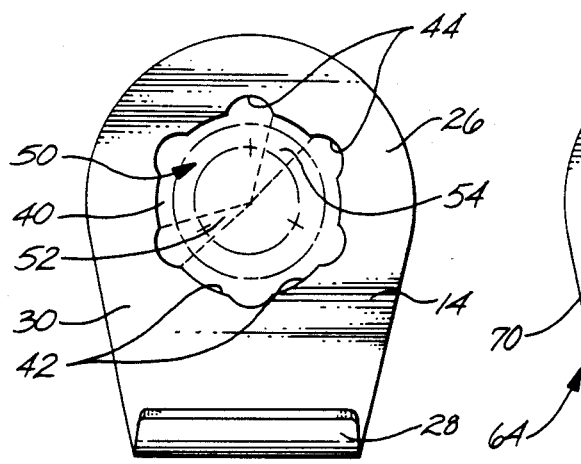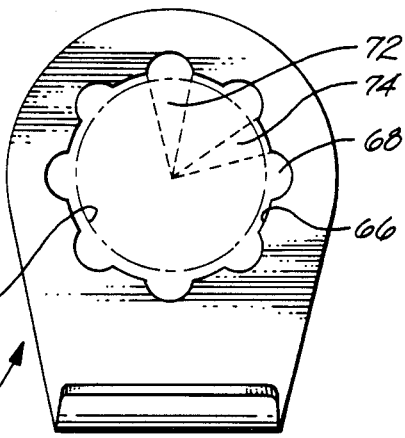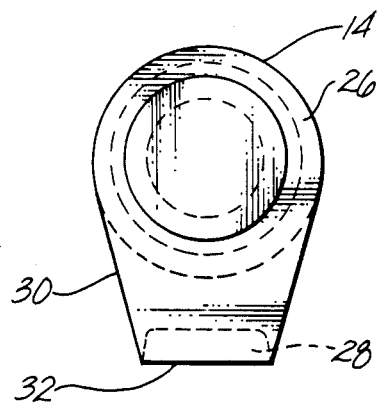

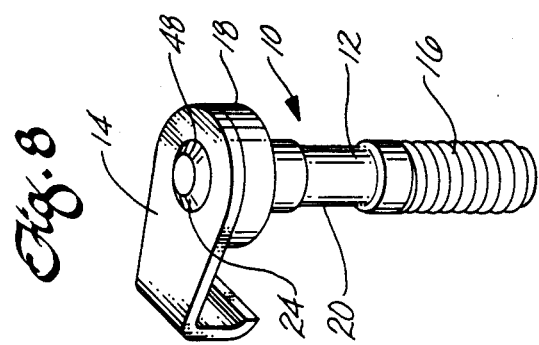
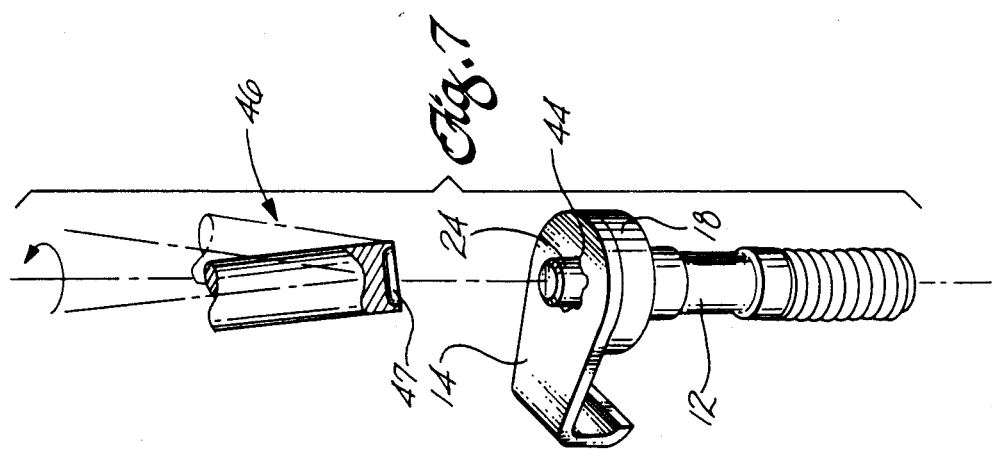
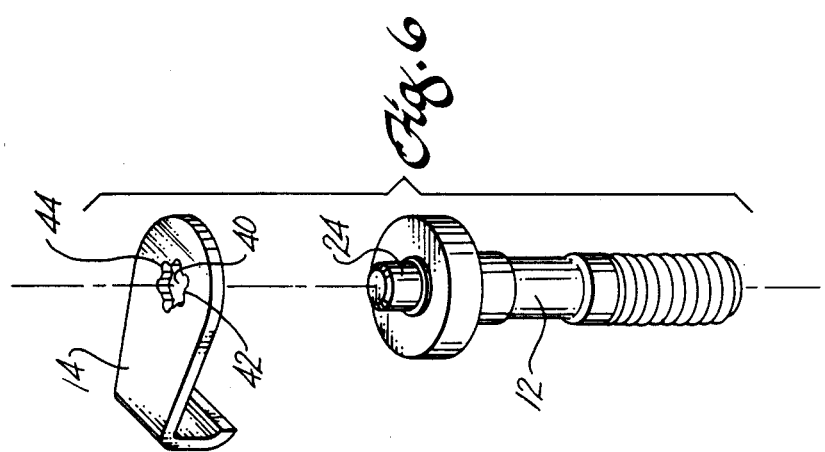

METHOD OF MAKING AN ENGINE CLIP BOLT

CROSS-REFERENCE TO RELATED APPLICATIONS

This is a continuation of application Ser. No. 07/374,479, filed June 30, 1989, abandoned, which is a continuation of application Ser. No. 07/253,706 filed Oct. 5, 1988 abandoned.

BACKGROUND OF THE INVENTION

The present invention relates to fasteners in general, and, more in particular to engine clip bolts.

Engine clip bolts fasten parts of aircraft engines together. Clip bolts are used where the head of the bolts cannot be held during installation and removal. Clip bolts do not rotate during installation and removal of cooperating nuts. Clip bolts also are constrained axially before nut installation and after nut removal. With clip bolts, parts of an engine can be properly registered with respect to each other and the parts moved and rotated without the nuts being installed.

To prevent rotation of a clip bolt, its clip bears against structure of the engine. More specifically, each clip has an ear attached directly to its bolt and that extends laterally away from the bolt to a tang or hook that bends back towards the bolt. The bight of the hook mechanically interferes with the structure of the engine to keep the clip bolt from rotating during nut installation and removal. The nose of the hook axially interfers with the structure to keep the clip bolt with the engine structure even without the cooperating nut.

The clip should be reliably and strongly attached to its bolt. If the clip and the bolt come rotationally unattached during installation and before the desired amount of tightening, the nut cannot be further tightened on the bolt, resulting in an unsatisfactory joint. Clips of the clip bolts cannot separate from the structure they are used with because of the danger that the clips will be ingested into the engine. To avoid the possibility of separation, the bolts use clips that stay with the bolt even if they become rotationally uncoupled.

Attaching the clip to the bolt presents problems. Welding the clip to the bolt can affect the metallurgy of both, and the reliability of the resulting joint is not always good. Welding is also an expensive procedure. Another approach uses axially extending pins of the bolt that receive the clip and that are swaged to lock the clip to the bolt. Problems with this approach include expense and a high percentage of unreliable unions. A third approach uses an externally splined bolt that receives internal splines of the clip with the end of the bolt again swaged over the top of the clip to axially lock the two together. This third approach is also expensive because of the external splines on the bolt and because of the necessity to register the external and internal splines during assembly.

SUMMARY OF THE INVENTION

The present invention provides an improved engine clip bolt that inexpensively attaches the clip to the bolt with a strong joint. This strong joint results from an end of the bolt swaged into recesses in the perimeter of a hole in the clip and simultaneously swaged over the clip. The clip bolt is easily manufactured. Visual inspection of the completed clip bolt is reliable because adequate swage is visually obvious. Swaging is preferably by an orbital swaging tool that develops good radial as well as axial movement of swaged bolt material; with the good radial movement the amount of circumferential interference between the bolt and the clip can be high and the amount of axial interference can also be high.

In its preferred form, the present invention provides a clip bolt where the rotational union between the clip and the bolt is at least as great as the break away torque between them but lower than the torsional strength of the bolt; this prevents tightening the clip bolt to bolt failure. Since the clip is axially attached to the bolt as well, if the torsional union between them should fail the clip still stays with the bolt.

In a specific form, the invention contemplates both a method for producing the clip bolt and the clip bolt itself. The method includes forming a bolt with a head proximate one end and a thread at the other end. A boss is formed on the head that extends axially from the head away from the threaded end. This boss is circular in radial cross-section. The method also contemplates forming a clip that has means such as a tang for engaging the structure in which the clip bolt is used to keep the clip bolt from rotating during the tightening or removal of a nut on the bolt thread. The clip also has an ear integral with the tang that has a circular hole of a diameter greater than the diameter of the boss. Recesses, preferably scallops, are formed in the perimeter of the hole to receive swaged boss material. The clip is placed on the bolt with the boss of the bolt in the hole of the clip and bearing against the bolt head. The boss is then heated. The boss is then swaged to expand it radially into the recesses to unite the clip and bolt rotationally with a mechanical lock. The swaging also expands boss material radially over the recesses and adjacent clip material to axially unite the clip and bolt with a mechanical lock.

Preferably, the recesses have perimeters defined by circular arcs that have a center of curvature lying on a circle that is concentric with and inside the circular hole. As stated above, we presently prefer to have the rotational lock at least as great as the torque at desired preload of a completed joint but less that the ultimate torsional strength of the bolt. In specific embodiments of this invention, this result follows when the recesses have circular arc shaped perimeters with the total of the distance between the recess along the perimeter of the circular hole about equal to the total distance across the mouths of the recesses measured along the same circle and with between six and eight recesses.

These and other features, aspects and advantages of the present invention will become more apparent from the following description, appended claims and drawings.

BRIEF DESCRIPTION OF THE DRAWINGS

FIG. 1 is a plan view of a clip of the clip bolt of the present invention;

FIG. 2 is a plan view of another embodiment of the clip of the clip bolt of the present invention;

FIG. 4 is a top plan view of the clip bolt of the present invention;

FIG. 6 is a perspective view of the clip and clip bolt of the present invention being assembled;

FIG. 7 is a perspective view similar to FIG. 6 illustrating an orbital swage that deforms the boss of the bolt to effect the completed clip bolt; and FIG. 8 is a perspective view of the completed clip bolt.

DETAILED DESCRIPTION

Figure 5:
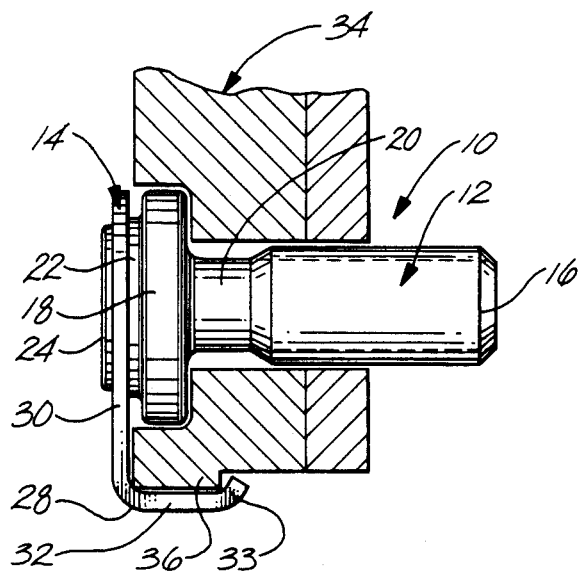
FIG. 5 is a side elevational view partly in section of the clip bolt of the present invention being installed.

FIGS. 5 and 8 show a completed clip bolt of the present invention, and we will broadly describe the clip bolt with reference to these Figures. In these figures, a clip bolt 10 consists of a bolt 12 and a clip 14. The bolt has a thread 16 extending axially from one of its ends, and a head 18 at its other end. A shank 20 between the thread and the head has a diameter less than either. An optional shoulder or washer pad 22 of the head bears against the underside of clip 14. The shoulder has a diameter less than the head. A swaged boss 24 secures clip 14 to bolt 12.

With particular reference to FIGS. 1, 4 and 5, clip 14 includes an ear 26 and a tang or hook 28. The tang or hook joins ear 26 through a neck 30. The clip generally is planar, but with the tang bending away from the plane at one end. As seen best in FIG. 5, the tang bends back on itself to present a bight 32 and a re-entrant lip 33.

The tang of the clip installed in structure appears as in FIG. 5. There, structure 34 presents an external shoulder 36, and tang 28 extends around and in back of it with bight 32 torsionally coupling the clip bolt to the structure and lip 33 behind the shoulder.

In general, the configuration just described is in the prior art. Clip bolts are used in aircraft engines. The clip of each bolt prevents the bolt from turning during the tightening of a cooperating nut, not shown, onto thread 16. The clip also prevents rotation of the bolt during nut removal during engine service. The clip does this by bight 32 engaging shoulder 36. An axial constraint provided by lip 33 acting on shoulder 36 keeps the clip bolt in place to receive the nut. This axial constraint is important because the engine structures are often turned prior to installation of the nuts on the bolts. The clip and bolt are joined together so that the clip cannot rotate with respect to the bolt during the installation of the nut.

The present invention effects this rotational union as well as an axial union between the clip and bolt by orbital swaging. With reference to FIGS. 1 and 6, clip 14 has a hole 40. The hole has first sections or lands 42 that fall on a diameter of a common circle, the diameter being slightly larger than the diameter of unswaged boss 24 of bolt 12. A plurality of regularly spaced recesses 44 open into hole 40 at the circumference of the circle the section or lands fall onto. These recesses provide void volumes to receive swaged material from boss 24.

Before assembling the clip and the bolt and before swaging, it may be necessary to anneal the boss to make it ductile enough to swage.

With reference to FIG. 7, clip 14 and bolt 12 are assembled with the clip over boss 24 of the bolt and the ear of the clip bearing against head 18 of the bolt. Boss 24 extends away and clear from clip 14.

An orbital swaging tool, shown schematically at 46, swages boss 24 to move its material axially and radially. The tool has a die 47 that determines the final configuration of the swaged boss. The material of the boss moves radially into recesses 44 to provide the rotational, mechanical interference lock between the clip and the bolt. Swaged material also expands above the clip to provide an external cylindrical flange 48 (see FIG. 8) that bears against the clip and compressively holds the clip and the bolt head together.

Figure 3:
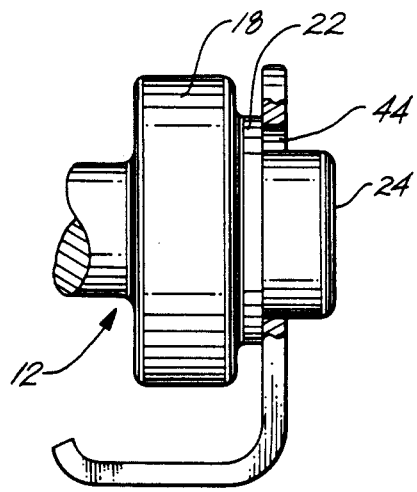
FIG. 3 is a view partly fragmented and partly in half section of the union of the clip and bolt of the clip bolt of the present invention.

FIG. 3 shows the relationship between the clip, bolt head and boss before swaging. There, boss 24 extends through hole 40. The boss has a diameter slightly less than the hole. One of the recesses 44 is shown opening into the hole and facing boss 24. FIG. 2 also shows clearly the clip bearing against shoulder 22, of head 18 of bolt 12.

In general, the strength of the union between the clip and the bolt in torsion should be greater than the torque at desired preload but less than the torsional strength of the bolt. As is well known, torque correlates with preload: the greater the torque, the greater the axial compressive load applied by the fastener system of the clip bolt and a nut to the structure. As has been mentioned before, the torsional strength of the mechanical lock between the clip and the bolt should be greater than the torque at predetermined preload, but less than the strength of the bolt. This effects a failure of the rotational lock before the bolt can fail. If the lock should fail in torsion after installation, the clip will still be retained with the bolt because of axial interference provided by swaged boss 24. With such a failure there would still be a good joint. If the torsional strength of the mechanical lock between the bolt and clip is higher than the torsional strength of the bolt and the bolt should fail, the joint will be bad and there can be loose parts that can be ingested into the engine.

We have found that the required strength of the torsional union between the bolt and clip can be produced by having recesses 44 six to eight in number. Each of the recesses preferably has a perimeter defined by an arc of a circle. With reference to FIG. 1, the defining circle has a center that falls on the circumference of an interior circle 50. Sections or lands 42 between the recesses fall on the circumference of the circle that defines hole 40. The interior circle is concentric to the circle that defines hole 40 and has a slightly smaller diameter. The mouth of each recess subtends an angle such that the sum of the subtended angles is about 180 degrees. This angle is shown at 52. Each land subtends an angle such that the sum of the subtended angles is about 180 degrees. One of these angles is shown at 54. In other words, the mouths of the recesses occupy a distance along the same circle about equal to the distance along the circle between the recesses and occupied by the lands. FIG. 1 shows six of the recesses in the form of scallops.

FIG. 2 shows a variation of the clip with eight recesses. There a clip 64 has a hole 66 and eight recesses 68. Each of the recesses has a center of curvature that falls on a circle 70. Circle 70 is concentric with hole 66. Each recess subtends an angle 72. Each land subtends an angle 74. The total of the subtended angles of the recesses about equals the total of the subtended angles of the lands.

The clip bolt of this invention provides a very reliable joint: the parts do not come apart. The bolt is also economical to produce. The use of a cylindrical boss and swaging that boss into scallops in the clip means that the clip can be located at any rotational position with respect to the boss; something which is not easy to do with an external and internal spline arrangement, especially if they are in interference. The scallops with swaged boss material in them provide considerably more resistance to torsion than the prior art clip bolt that utilizes three pins extending through three cooperating holes of the clip. The swaged head of the clip provides a good visual assurance that the clip and bolt have been properly joined. The reliability of this visual inspection is greater that visual inspection of a welded connection between a clip and a bolt and does not have the disadvantages of adversely affecting the metallurgy of the part and is less expensive.

The present invention has been described with reference to a certain preferred embodiment. The spirit and the scope of the appended claims should not, however, necessarily be limited to the foregoing description.

We claim:

1. A method for producing an engine clip bolt comprising the steps of:
   (a) producing a bolt having a male threaded end at one end, a head larger in diameter than the male threaded end proximate the other end, and a circular in radial cross section boss extending from the head opposite from the male threaded end and having a diameter smaller than the head;
   (b) producing a clip having means for engaging structure with which the clip bolt is used to provide a mechanical torsional lock between the structure and the clip bolt, an ear with a thickness less than the length of the boss, and a hole having a perimeter that includes first and second alternating sections, each of the first sections falling on the circumference of a circle that has a radius slightly larger than the radius of the boss, each of the second sections opening onto this circumference, the torsional strength of the clip between the second sections being less than that of the bolt but at least as great as the torque applied to the bolt at a predetermined preload on the structure applied by the bolt and a cooperating nut;
   (c) placing the boss into the hole of the clip with the ear bearing on the head of the bolt and the boss extending through the clip with a portion of the boss extending above the clip; and
   (d) orbitally swaging the portion of the boss extending above the clip so that it expands in radius to fill the hole and engages the first and second alternating sections of the clip for torsionally locking the clip to the bolt and also expands in radius over the clip to a radius larger than the radius of the circle to axially lock the clip to the bolt;
   whereby, the clip and the bolt unite into a clip bolt with the clip rotationally and axially coupled to the bolt.

2. The method claimed in claim 1 wherein the perimeter of each of the second sections is the arc of a circle having a center on a circle concentric with the first mentioned circle and slightly smaller in diameter.

3. The method claimed in claim 2 wherein each of the second sections has a mouth falling on the circumference of the circle, the aggregate length of the mouths being about equal to the aggregate length of the first sections.

4. The method claimed in claim 1 wherein each of the second sections has a circular perimeter with a radius that falls on a second circle within the first mentioned circle and concentric with it.

5. The method claimed in claim 4 wherein there are between six and eight of the second sections.

6. The method claimed in claim 5 wherein the orbital swaging step deforms the boss where it extends away from the clip to a radius at least sufficient to overlie the second sections.

7. A method for manufacturing an engine clip bolt comprising the steps of:
   (a) heading a bolt to form a head proximate a first end of the bolt and a circular in radial cross-section boss extending axially from the head to the first end, the boss having a diameter smaller than the head;
   (b) forming a thread on the bolt beginning at the second end of the bolt and extending towards the head;
   (c) forming a clip having a tang for engaging the structure with which the clip bolt will be used to prevent rotation of the clip bolt, an ear integral with the tang, a circular hole in the ear having a diameter greater than the diameter of the boss for receiving the boss, and regularly spaced scallops opening into the perimeter of the hole;
   (d) heating the boss to soften it;
   (e) positioning, the clip on the bolt with the clip bearing against the head of the bolt and the boss of the bolt extending through the hole with a portion of the boss extending above the clip; and
   (f) orbitally swaging the portion of the boss extending above the clip to expand it radially into the scalloped openings and over clip material circumferentially of the openings, the scalloped openings and the bolt material swaged into them providing a torsional union between the bolt and the clip that has a controllable break away torque at least as great as the torque on the bolt at a predetermined preload to be applied to the structure fastened by the bolt and cooperating nut and less than the ultimate strength of the bolt in torsion.

8. The method claimed in claim 7 wherein there are between six and eight of the scalloped openings.

9. The method claimed in claim 7 wherein the swaged boss has a circular periphery.

10. The method claimed in claim 9 wherein there are between six and eight of the scalloped openings.

11. The method claimed in claim 9 wherein the scallops subtend the circular hole along a length substantially equal to the length of the perimeter of the hole between scallops.

12. The method claimed in claim 11 wherein the heading step produces a cylindrical shoulder of the head adjacent to the boss, the circular shoulder having a diameter that is smaller than at least a portion of the head and bearing against the clip after the placement step.

13. A method for producing an engine clip bolt comprising the steps of:
   forming a bolt having a male threaded end at one end, a head larger in diameter than the male threaded end at the other end, and an axial raised boss extending from the head opposite from the male threaded end and having a cross-section smaller than the head;
   forming a clip having means for engaging structure with which the clip bolt is used to provide a mechanical torsional lock between the structure and the clip bolt, an ear with a thickness less than the height of the boss, and a hole through the ear having a perimeter that includes first and second alternating sections, each of the first sections falling on the circumference of a circle, each of the second sections opening onto this circumference;

placing the boss into the hole of the clip with the ear bearing on the head of the bolt and the boss extending through the hole in the clip with a portion of the boss extending above the clip; and orbitally swaging the portion of the boss extending above the clip so that the boss fills the hole and engages the first and second alternating sections of the clip for torsionally locking the clip to the bolt and also expands in radius over the clip to a diameter larger than the hole for axially locking the clip to the bolt, the torsional strength of the joint between the clip and boss being less than that of the bolt but at least as great as the torque applied to the bolt at a predetermined preload on the structure applied by the bolt and a cooperating nut;

whereby, the clip and the bolt unite into a clip bolt with the clip rotationally coupled to the bolt for failure, if at all, at a torque less than the torque strength of the bolt, and axially coupled to the bolt for retention on the bolt in the event of torque failure.

14. The method claimed in claim 13 wherein each of the second sections has a circular perimeter with a radius that falls on a circle within the hole through the clip.

15. The method claimed in claim 13 wherein each of the second sections has a mouth falling on the circumference of the circle, the aggregate length of the mouths being about equal to the aggregate length of the first sections.

16. The method claimed in claim 13 wherein there are between six and eight of the second sections.

* * * * *